US010184280B2

(12) United States Patent
Rahman et al.

(10) Patent No.: US 10,184,280 B2
(45) Date of Patent: Jan. 22, 2019

(54) AUTOMOTIVE DOOR HINGE

(71) Applicant: Flex-N-Gate Advanced Product Development, LLC, Warren, MI (US)

(72) Inventors: Rafath Rahman, Toronto (CA); Murray Dobson, Nobleton (CA); Steven Demoe, Cameron (CA)

(73) Assignee: FLEX-N-GATE ADVANCED PRODUCT DEVELOPMENT, LLC., Warren, MI (US)

( * ) Notice: Subject to any disclaimer, the term of this patent is extended or adjusted under 35 U.S.C. 154(b) by 0 days.

(21) Appl. No.: 15/610,772

(22) Filed: Jun. 1, 2017

(65) Prior Publication Data

US 2017/0350176 A1 Dec. 7, 2017

Related U.S. Application Data

(60) Provisional application No. 62/344,631, filed on Jun. 2, 2016.

(51) Int. Cl.

| | |
|---|---|
| ***E05D 5/10*** | (2006.01) |
| ***E05D 3/02*** | (2006.01) |
| ***B60J 5/04*** | (2006.01) |
| ***E05D 5/12*** | (2006.01) |
| *E05D 11/06* | (2006.01) |

(52) U.S. Cl.

CPC ................ *E05D 3/02* (2013.01); *B60J 5/047* (2013.01); *E05D 5/121* (2013.01); *E05D 11/06* (2013.01); *E05D 2005/102* (2013.01); *E05Y 2201/632* (2013.01); *E05Y 2900/531* (2013.01)

(58) Field of Classification Search

CPC ........... E05D 5/121; E05D 5/04; E05D 5/043; E05D 5/06; E05D 5/062; E05D 11/06; E05D 7/1044; E05D 7/121; E05D 2005/102; E05Y 2201/632; E05Y 2900/50; E05Y 2900/531; B60J 5/047; Y10T 16/557; Y10T 16/558; Y10T 16/5595; Y10T 16/55988

See application file for complete search history.

(56) References Cited

U.S. PATENT DOCUMENTS 2,312,029 A * 2/1943 Conwell .................. E05D 3/02 16/389

2,978,736 A 4/1961 Welker (Continued)

FOREIGN PATENT DOCUMENTS

DE 2159801 A1 * 6/1973 ............... E05D 5/14

EP 0149492 A2 * 7/1985 ............... E05D 5/10

(Continued)

*Primary Examiner* — Chuck Y Mah

(74) *Attorney, Agent, or Firm* — Foley & Lardner LLP

(57) ABSTRACT

A vehicle door hinge that includes a door bracket mountable to a vehicle door, a body bracket mountable to a vehicle body, a pivot bushing having a cylindrical bearing that is disposed within a pivot axis hole of the body bracket, and a pivot pin that rotatably couples the door bracket and the body bracket together. The pivot pin includes a first shoulder disposed within the cylindrical bearing; and the pivot pin includes a second shoulder extending from the first shoulder. The second shoulder has a knurled cylindrical surface that is disposed within a pivot axis hole of the door bracket.

19 Claims, 4 Drawing Sheets

(56) References Cited

U.S. PATENT DOCUMENTS

| | | | | | |
|---|---|---|---|---|---|
| 3,006,039 | A * | 10/1961 | Brydolf | E05D 5/06 | 16/379 |
| 4,542,558 | A * | 9/1985 | Brockhaus | E05D 5/128 | 16/263 |
| 4,854,009 | A * | 8/1989 | Brockhaus | E05D 5/12 | 16/263 |
| 5,092,017 | A * | 3/1992 | Hatano | E05D 5/10 | 16/273 |
| 5,577,295 | A * | 11/1996 | Papke | E05D 5/128 | 16/254 |
| 5,682,646 | A * | 11/1997 | Tyler, IV | E05D 5/062 | 16/264 |
| 5,867,870 | A * | 2/1999 | Kluting | E05D 5/128 | 16/254 |
| 5,950,295 | A * | 9/1999 | Worden | B62D 65/06 | 118/500 |
| 6,163,929 | A * | 12/2000 | Bradley | E05D 5/127 | 16/380 |
| 6,427,287 | B1 * | 8/2002 | Brueckner | E05D 11/10 | 16/342 |
| 6,591,451 | B2 | 7/2003 | Gruber et al. | | |
| 6,922,872 | B2 * | 8/2005 | Gruber | E05D 5/062 | 16/222 |
| 7,748,768 | B2 * | 7/2010 | Hofacker | E05D 5/121 | 16/374 |
| 7,908,712 | B2 * | 3/2011 | Rudzewski | E05D 11/06 | 16/334 |
| 2003/0182761 | A1 | 10/2003 | Kidd | | |
| 2004/0231103 | A1 * | 11/2004 | Magnuson | E05D 5/121 | 16/340 |
| 2006/0267373 | A1 * | 11/2006 | Maiwald | E05D 5/0207 | 296/146.1 |
| 2008/0295290 | A1 * | 12/2008 | Murray | E05D 5/062 | 16/386 |
| 2011/0035906 | A1 * | 2/2011 | Esaki | E05D 3/02 | 16/374 |
| 2011/0049834 | A1 * | 3/2011 | Natu | F16C 11/04 | 280/279 |
| 2012/0027215 | A1 * | 2/2012 | Sim | H04R 1/1041 | 381/55 |
| 2014/0165360 | A1 * | 6/2014 | Mangiarino | B62D 65/028 | 29/407.1 |

FOREIGN PATENT DOCUMENTS

| | | | | |
|---|---|---|---|---|
| EP | 1403458 | A1 * | 9/2002 | |
| EP | 1398440 | A2 * | 3/2004 | E05D 5/12 |
| FR | 2751019 | A1 * | 1/1998 | E05C 17/045 |

* cited by examiner

AUTOMOTIVE DOOR HINGE

CROSS-REFERENCE TO RELATED APPLICATIONS

The present application claims priority to and the benefits of U.S. Provisional Patent Application No. 62/344,631, filed on Jun. 2, 2016, which is incorporated by reference herein in its entirety.

BACKGROUND

The present application relates generally to the field of door hinge assemblies. More specifically, this application relates to an automotive door hinge assembly of minimal package size and weight.

SUMMARY

At least one embodiment of the present application relates to a vehicle door hinge that includes a door bracket mountable to a vehicle door, a body bracket mountable to a vehicle body, a pivot bushing, and a pivot pin rotatably coupling the door bracket and the body bracket together. The pivot bushing includes a cylindrical bearing that is disposed within a pivot axis hole of the body bracket. The pivot pin includes a first shoulder disposed within the cylindrical bearing, and the pivot pin includes a second shoulder extending from the first shoulder. The second shoulder has a knurled cylindrical surface that is disposed within a pivot axis hole of the door bracket.

A diameter of the second shoulder may be sized differently than a diameter of the first shoulder. For example, the diameter of the second shoulder may be smaller than the diameter of the first shoulder. Alternatively, the diameter of the second shoulder may be larger than the diameter of the first shoulder.

The knurled cylindrical surface of the second shoulder may be press fit into the pivot axis hole of the door bracket to rigidly couple the pivot pin and the door bracket together, such that the pivot pin rotates with the door bracket upon rotation thereof (e.g., relative to the body bracket).

The pivot pin may include a head that extends from a side of the first shoulder that is opposite the second shoulder. The head may have a diameter that is larger than the diameter of the first shoulder. The pivot pin may include a foot that extends from a side of the second shoulder that is opposite the first shoulder. The foot may be configured to extend beyond an arm of the door bracket having the pivot axis hole disposed therein. The foot may have a diameter that is larger than a diameter of the pivot axis hole of the door bracket to retain the door bracket and the body bracket between the head and the foot of the pivot pin.

The pivot bushing may have a first flange that extends from a first end of the cylindrical bearing. The pivot bushing may have a second flange that extends from a second end of the cylindrical bearing. One of the first and second flanges may be disposed between a head of the pivot pin and the body bracket, and the other of the first and second flanges may be disposed between the door bracket and the body bracket. The pivot bushing may be configured to rotate with the door bracket upon rotation thereof relative to the body bracket, or the door bracket may be rotatable relative to the pivot bushing and the body bracket.

At least one embodiment relates to a vehicle door hinge that includes a first bracket, a second bracket, a pivot bushing, and a pivot pin. The first bracket includes a base, a single pivot arm extending transversely from the base, and a first pivot axis hole disposed in the single pivot arm. The second bracket includes a base, a single pivot arm extending transversely from the base of the second bracket, and a second pivot axis hole disposed in the single pivot arm of the second bracket. The pivot bushing has a cylindrical bearing that is disposed within the second pivot axis hole. The pivot pin extends through a bore of the cylindrical bearing, the first pivot axis hole, and the second pivot axis hole to rotatably couple the first and second brackets together with the pivot pin in single shear.

The pivot pin may include a knurled cylindrical surface having a press fit engagement with the first pivot axis hole to rigidly couple the pivot pin and the first bracket, such that the pivot pin rotates with the first bracket upon relative rotation between the first and second brackets. The pivot pin may include a head and a foot on opposite ends of the pivot pin. The head and the foot may be configured to retain the pivot bushing and the single pivot arms of the first and second brackets therebetween.

The vehicle door hinge may include a nut that threads to a threaded portion of the foot, wherein the knurled cylindrical surface is located between the threaded portion and the head of the pivot pin.

The pivot bushing may include a first flange and/or a second flange. The first flange extends radially outward from a first end of the cylindrical bearing, and the first flange may be disposed between the single pivot arm of the first bracket and the single pivot arm of the second bracket to facilitate relative rotation between the pivot arms. The second flange extends radially outward from a second end of the cylindrical bearing, and the second flange may be disposed between the single pivot arm of the second bracket and the head of the pivot pin.

At least one embodiment relates to a method of assembling a vehicle door hinge that includes providing a first bracket comprising a single pivot arm extending transversely from a base of the first bracket, where a first pivot axis hole is disposed in the single pivot arm of the first bracket. The method includes providing a second bracket having a single pivot arm extending transversely from a base of the second bracket, where a cylindrical bearing of a pivot bushing is disposed in a second pivot axis hole disposed in the single pivot arm of the second bracket. The method includes coupling a pivot pin to the pivot bushing and the first and second brackets to rotatably couple the first and second brackets together by press fitting a knurled cylindrical surface of the pivot pin with a receiving surface of the single pivot arm of the first bracket that defines the first pivot axis hole, where a shoulder of the pivot pin that is adjacent to the knurled cylindrical surface is disposed within a bore of the pivot pin and the second pivot axis hole.

The pivot pin may include a head that is located adjacent to the shoulder opposite the knurled cylindrical surface. The head may have a diameter that is larger than a diameter of the second pivot axis hole to retain the second bracket.

The pivot bushing may be coupled to the single arm of the second bracket by a first flange and a second flange, where the first flange extends radially outward from a first end of the cylindrical bearing and has a diameter that is larger than a diameter of the second pivot axis hole, and the second flange extends radially outward from a second end of the cylindrical bearing and has a diameter that is larger than the diameter of the second pivot axis hole.

The method may include forming a foot of the pivot pin onto a side of the single arm of the first bracket that is opposite the pivot bushing to clamp the single arm of the first bracket between the foot and the first flange of the pivot bushing, such that a diameter of the foot after forming is larger than a diameter of the second pivot axis hole and a diameter of the knurled cylindrical surface.

The method may include threading a nut onto a foot of the pivot pin to clamp the single arm of the first bracket between the foot and the first flange of the pivot bushing.

DETAILED DESCRIPTION

Referring generally to the Figures, disclosed herein are various embodiments of automotive door hinge assemblies. Door hinge assemblies are generally configured to rigidly attach to a vehicle closure panel (e.g., a door) and a vehicle body and to permit rotary movement of the closure panel relative to the body. The hinge assembly may be actuated by a user (e.g., by moving one component of the assembly rotationally relative to another component) to open and close a vehicle door. One issue associated with conventional door hinge assemblies is that, in many cases, each component (e.g., bracket) attaching to the vehicle door and the vehicle body is fabricated from multiple stamped parts that are joined together. While these brackets may meet load and functional requirements, the use of multiple parts may result in excess weight and package size. Joining multiple parts also results in tolerance stacking, leading to variation in the positions of holes and other features. It would advantageous to provide a door hinge assembly of minimal size, weight, and tolerance risk that meets required load and functional requirements. The exemplary embodiments described herein address this issue by providing a hinge assembly comprised of a door bracket coupled to a body bracket, wherein each bracket is fabricated as a unitary stamped part.

Figure 1:
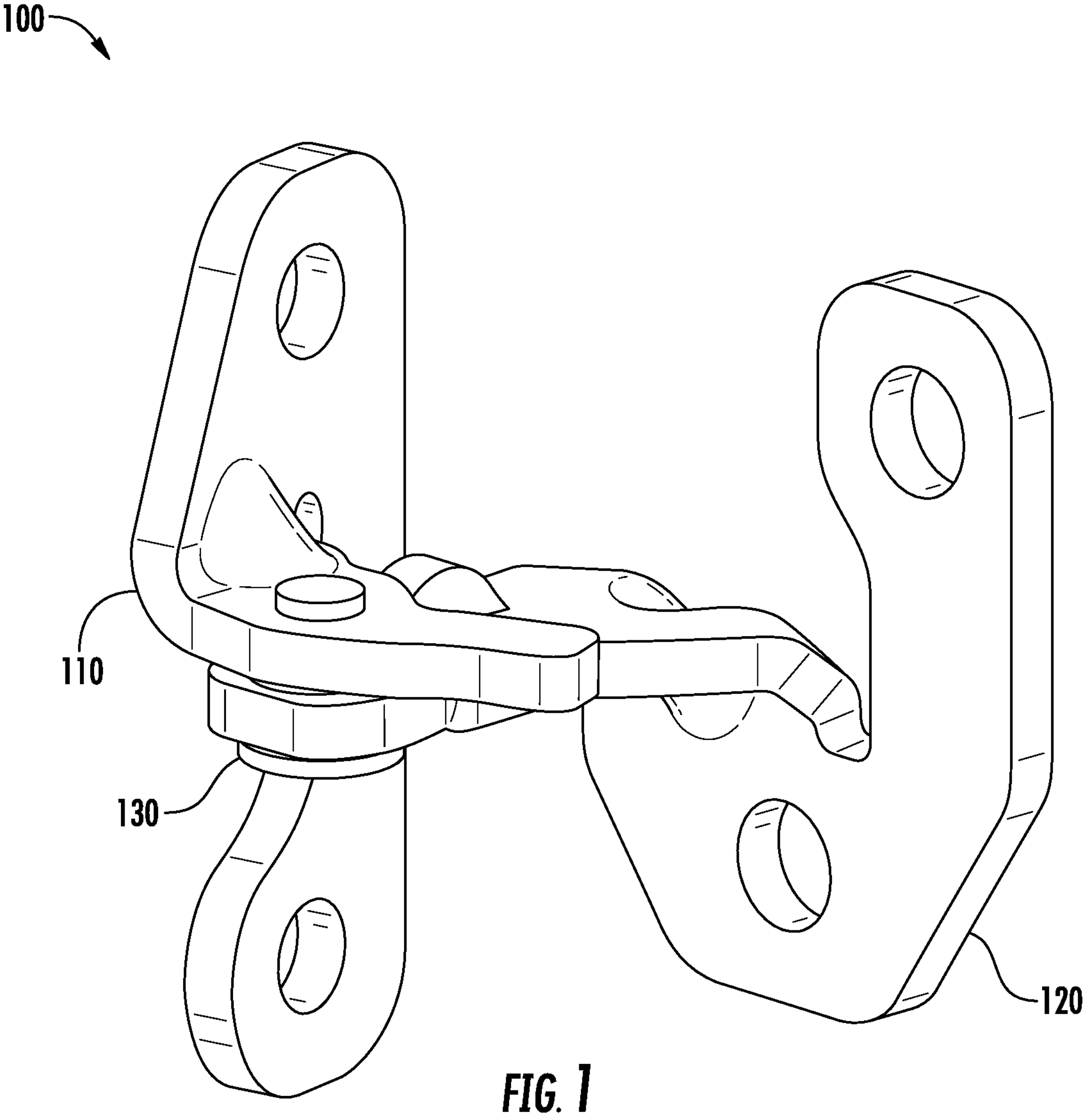
FIG. 1 is a perspective view of an automotive door hinge assembly, according to an exemplary embodiment of the present application.
Figure 2:
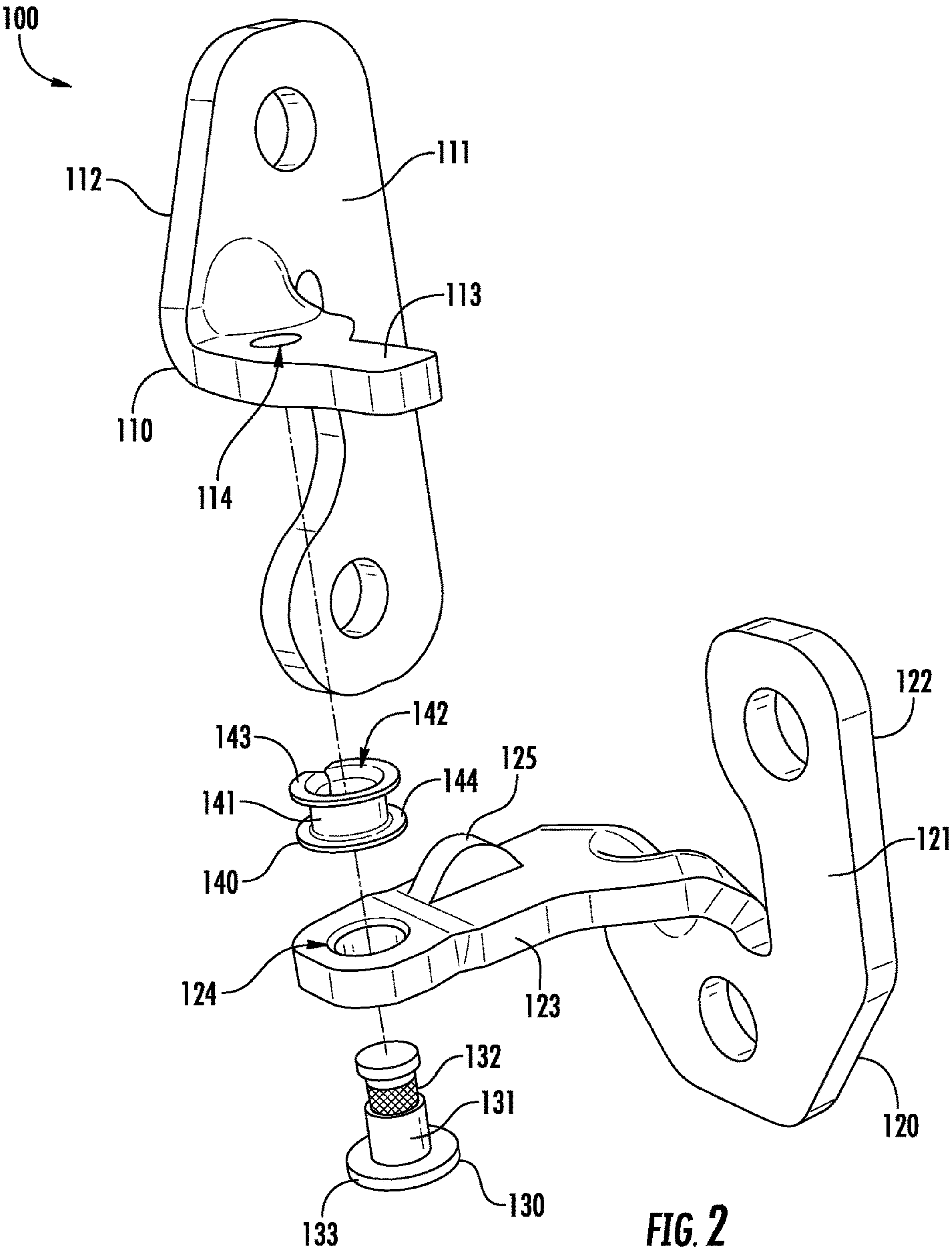
FIG. 2 is an exploded perspective view of the door hinge assembly shown in FIG. 1.

FIGS. 1 and 2 illustrate an exemplary embodiment of a hinge assembly 100 that includes two members/portions/components (e.g., a door component 110 and a body component 120) rotatably coupled together by a pivot pin 130 and a pivot bushing 140. The pivot pin 130 and the pivot bushing 140 are configured to facilitate rotational movement between the two components (e.g., rotation of the door component 110 relative to the body component 120). The hinge assembly 100 may further include a washer located between the door component 110 and the body component 120, or between the pivot pin 130 and one or both of the door component 110 and the body component 120.

Both the door component 110 and the body component 120 are constructed as angled brackets that are stamped (e.g., press formed) from a single piece (e.g., blank) of material. The properties of the material (e.g., type of metal, thickness, etc.) may be selected to optimize the weight of the components 110 and 120, while at the same time permitting the hinge assembly 100 to meet loading requirements. For example, the door component 110 and the body component 120 may be fabricated from identical materials. In other examples, the door component 110 and the body component 120 may be fabricated from different materials or from the same material but with different thicknesses such that they may have different performance characteristics.

The door component 110 includes a base 111 having a mounting surface 112 that is configured to mount to a vehicle door. One or more holes may be disposed in the base 111 for coupling the door component 110 to a vehicle door. The door component 110 also includes at least one pivot arm 113 extending transversely (e.g., orthogonally) from the base 111. As shown, only a single pivot arm 113 extends substantially perpendicular to the base 111. A pivot axis hole 114 is disposed in the pivot arm 113 and is configured to receive the pivot pin 130.

The body component 120 includes a base 121 having a mounting surface 122 that is configured to mount to a vehicle body. One or more holes may be disposed in the base 121 for coupling the body component 120 to a vehicle body. The body component 120 also includes at least one pivot arm 123 extending transversely from the base 121. As shown, only a single pivot arm 123 extends substantially perpendicular to the base 121. A pivot axis hole 124 is disposed in the pivot arm 123 and is configured to receive the pivot pin 130.

In a fully assembled state of the hinge assembly 100, the pivot arm 113 of door component 110 and the pivot arm 123 of body component 120 may be arranged with the pivot axis holes 114, 124 aligned and the pivot arm 113 of door component 110 located on top of (e.g., above) the pivot arm 124 of body component 120. The pivot arm 113 may be arranged surface to surface with the pivot arm 123, such as, for example, with a bottom surface of the pivot arm 113 of the door component 110 contacting a top surface of the pivot arm 123 of the body component 120. The pivot arm 113 may be arranged offset (e.g., spaced apart) from the pivot arm 123. For example, if the pivot bushing 140 is provided, the pivot arm 113 of the door component 110 may be spaced apart from the pivot arm 123 of the body component 120 by at least the thickness of a portion of the pivot bushing 140 (e.g., a flange thereof).

The pivot axis hole 114 of the door component 110 may be located close to the mounting surface 112, with the majority of the length of the pivot arm 113 extending beyond the pivot axis hole 114. By contrast, the pivot axis hole 124 of the body component 120 may be located near the terminating point of the pivot arm 123.

The mounting surfaces 112, 122 of the door component 110 and the body component 120 may contain mounting holes or other mounting features to permit fasteners to couple components 110 and 120 to their respective mounting locations. The size and locations of the mounting holes on the mounting surfaces of components 110 and 120 may be selected to optimize loading on hinge assembly 100 when the assembly is installed in a vehicle. The mounting surface 112 of the door component 110 may be configured to structurally attach to a vehicle closure panel (i.e., a vehicle door), whereas the mounting surface 122 of the body component 120 may be configured to structurally attach to a vehicle body. The components 110 and 120 may be structurally attached to the vehicle closure panel or the vehicle body using bolting, welding, bonding, riveting, or similar fastening means.

The body component 120 is further configured to include a hinge stop 125 for limiting rotation of the door component 110 relative to the body component 120. As shown in FIG. 2, the hinge stop 125 is formed on the pivot arm 123 between the pivot axis hole 124 and the mounting surface 122. For example, the hinge stop 125 may be a lanced tab formed out of the pivot arm 123, such that the hinge stop 125 stands proud of a top surface of the pivot arm 123. The hinge stop 125 may be configured to limit rotation of the door component 110. For example, a portion (e.g., an end) of the pivot arm 113 may be configured to contact the hinge stop 125 after a predetermined rotation of the door component 110 relative to the hinge component 120. The hinge stop 125 may be configured to interact with the pivot arm 113 of the door component 110, such that when the door hinge assembly 100 is rotated to its full open position (e.g., when the pivot arms are substantially parallel to each other), the hinge stop 125 contacts the pivot arm 113 of the door component 110 and prevents further rotation past the full open position.

The pivot pin 130 may advantageously be configured to perform two primary functions in the hinge assembly 100 by structurally coupling the door component 110 to the body component 120 and facilitating relative rotational movement between the components. As shown in FIG. 2, the pivot pin 130 includes a first shoulder 131 and a second shoulder 132 extending from the first shoulder 131. The first shoulder 131 is disposed within the cylindrical bearing 141 of the pivot bushing 140 upon assembly of the hinge assembly 100, and the first shoulder 131 includes a cylindrical pivot surface mating with an inner surface of the cylindrical bearing 141. The first shoulder 131 may terminate at a head 133, if provided. The second shoulder 132 includes a cylindrical knurled surface, such as, for example, near an end of the pivot pin 130. The knurled surface of the second shoulder 132 may have a diameter that is smaller than a diameter of the pivot surface of the first shoulder 131, and the pivot surface may have a diameter that is smaller than the head 133 of the pivot pin 130.

The pivot pin 130 may be installed in the hinge assembly 100 such that the head 133 is located underneath the pivot arm 123 of the body component 120, and the first shoulder 131 (e.g., the cylindrical pivot surface) passes through the pivot axis hole 124 of the body component 120 and is disposed in a bore 142 of the pivot bushing 140. The second shoulder 132 (e.g., the knurled surface) of the pivot pin 130 may be configured to insert into and rigidly attach to the pivot axis hole 114 of the door component 110, such that rotation of the door component 110 (e.g., opening the vehicle door) also causes rotation of the pivot pin 130. As shown in FIGS. 1 and 2, the single pivot arm 113 of the door bracket 110 and the single pivot arm 123 of the body bracket 120 are configured to load the pivot pin 130 in single shear. This arrangement advantageously reduces the size required for and the weight of the hinge assembly 100.

The pivot bushing 140 includes at least one bearing surface. For example, the cylindrical bearing 141 of the pivot bushing 140 may contain an internal cylindrical bearing surface. When the hinge assembly 100 is fully assembled, the pivot pin 130 is located within the pivot bushing 140 such that a cylindrical pivot surface (e.g., the first shoulder 131 or a portion thereof) of the pin 130 may freely rotate within the internal cylindrical bearing surface of the pivot bushing 140.

The pivot bushing 140 may include one or more thrust flanges. As shown in FIG. 2, the pivot bushing 140 includes a first flange 143 (e.g., first thrust flange), which extends radially outward from a first side (e.g., first end) of the cylindrical bearing 141, and a second flange 144, which extends radially outward from a second side (e.g., second end) of the cylindrical bearing 141. If provided, upon assembly, the first flange 143 is disposed between the pivot arm 113 of the door component 110 and the pivot arm 123 of the body component 120 to facilitate rotation between the components. The first flange 143 may be in contact with one or both of the pivot arms 113, 123. If provided, upon assembly, the second flange 144 is disposed between (and may contact one or both of) the pivot arm 123 of the body component 120 and the head 133 of the pivot pin 130. The pivot bushing 140 may be pressed into or otherwise rigidly attached to the pivot axis hole 124 of body component 120. For example, the cylindrical bearing 141 may be pressed into the pivot axis hole 124, and the first and second flanges 143, 144 may be formed (e.g., pressed, staked, etc.) onto two opposite sides of the pivot arm 123.

Figure 3:
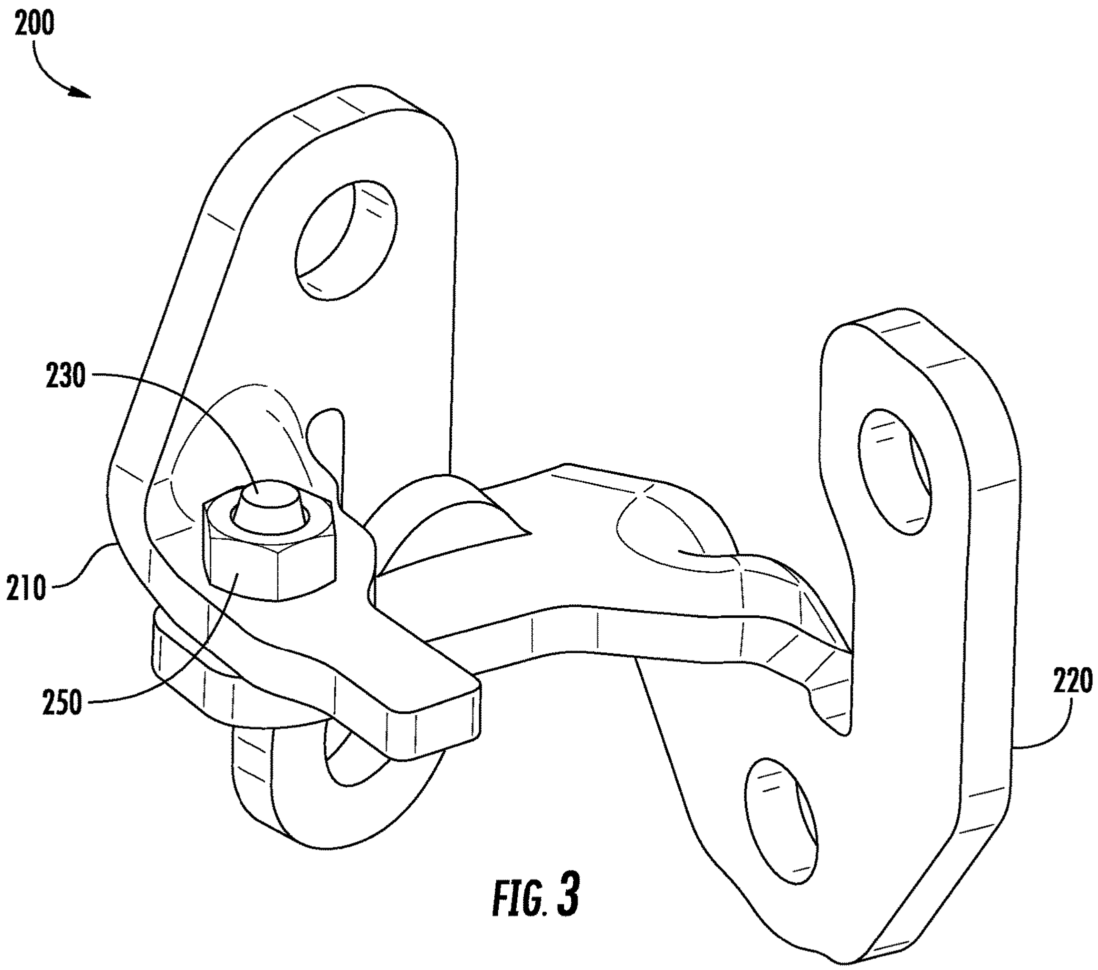
FIG. 3 is a perspective view of an automotive door hinge assembly, according to another exemplary embodiment.
Figure 4:
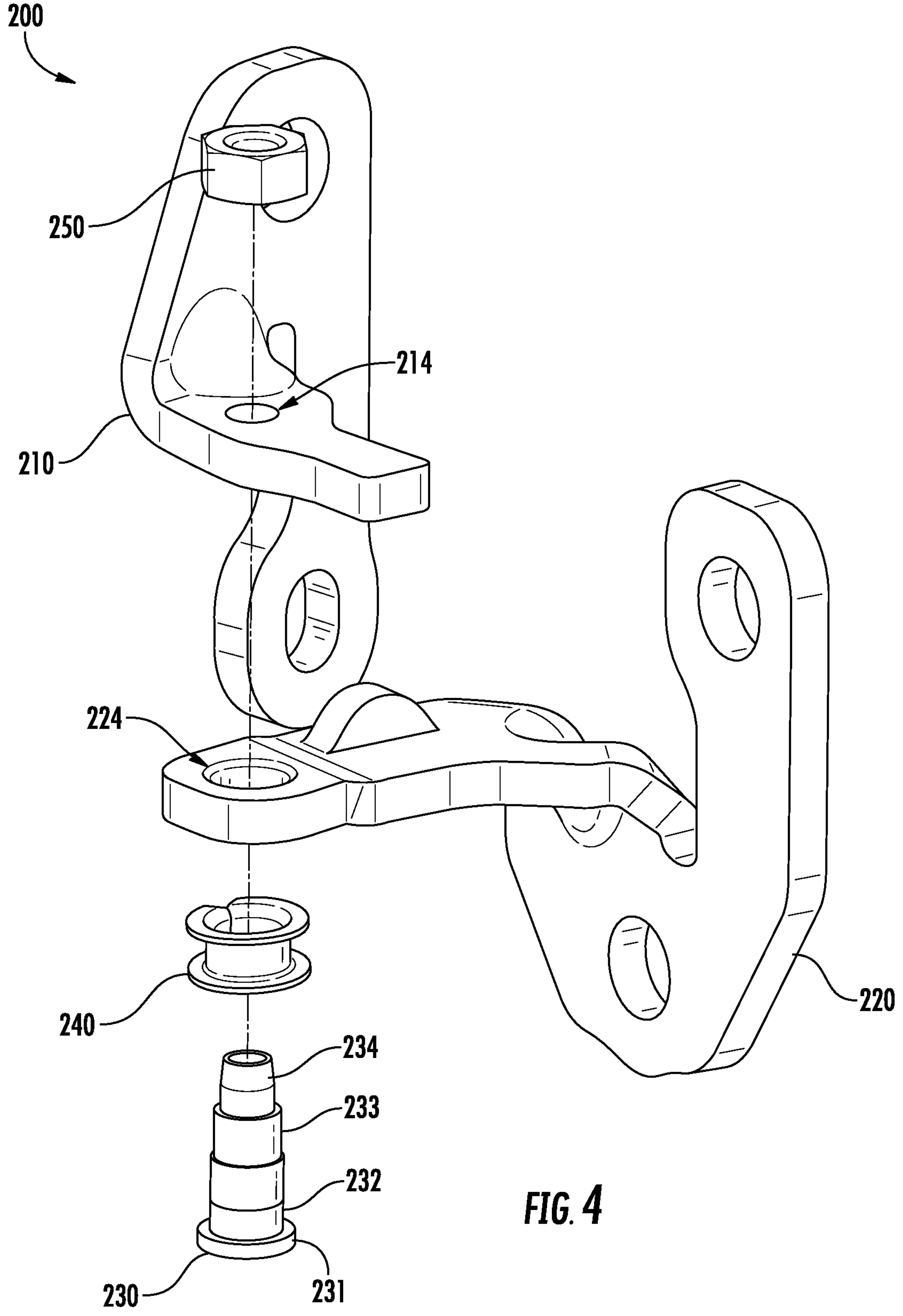
FIG. 4 is an exploded perspective view of the door hinge assembly shown in FIG. 3.

FIGS. 3 and 4 illustrate another exemplary embodiment of a hinge assembly 200. The hinge assembly 200 includes two portions (hereinafter referred to as a door component 210 and a body component 220) rotatably coupled together by a pivot bolt 230, a pivot bushing 240, and a nut 250. The pivot bolt 230, the pivot bushing 240, and the nut 250 may be configured to permit rotational movement between door component 210 and body component 220. The hinge assembly 200 may optionally include one or more (e.g., a plurality of) washers located between any of the aforementioned assembly components.

The hinge assembly 200 is configured to facilitate ease of separation between the door component 210 and the body component 220. This configuration may be particularly advantageous and useful in vehicle assembly plants, as it permits the vehicle door to be installed on a vehicle body during the painting process, removed during installation of the vehicle interior, and re-installed once the vehicle interior is complete. This procedure may be generally referred to as a "lift-off" process.

Both the door component 210 and the body component 220 of the hinge assembly 200 are shown (in FIGS. 3 and 4) constructed in the same manner as the door component 110 and the body component 120 discussed above, namely as angled brackets that can be stamped from a single piece of material. However, rather than employing the pivot pin 130, the hinge assembly 200 includes a pivot bolt 230 that structurally couples the door component 210 to the body component 220 and facilitates relative rotational movement between the components. The pivot bolt 230 is configured to include a bolt head 231 at one end, a generally cylindrical surface 232 extending from the bolt head 231 and configured to be rigidly attached (e.g., press fit) to the body component 220, a generally cylindrical pivot surface 233, and a threaded portion 234 terminating the pivot bolt 230 at an opposite end from the bolt head 231. The pivot surface 233 may have a smaller diameter than the cylindrical surface 232 and may be configured to be press fit into the body component 220. The pivot surface 233 may pass through the pivot axis hole 214 of the door component 210 and permit the door component 210 to rotate relative to the body component 220.

As shown best in FIG. 4, the hinge assembly 200 may further include a pivot bushing 240 and a nut 250. Similar to its function in the hinge assembly 100, the pivot bushing 240 may be press fit or otherwise rigidly attached into the pivot axis hole 224 of the body component 220. The nut 250 is configured to thread with the threaded portion 234 of the pivot bolt 230, e.g., once the door component 210 has been installed on top of the body component 220, to couple the nut 250 and the pivot bold 230 to retain the components 210 and 220 in a fully installed configuration. If beneficial for the particular application, the nut 250 may be replaced during the lift-off process (i.e., a new nut 250 may replace original nut 250 after hinge assembly 250 has been disassembled to permit vehicle interior installation and re-assembled at the completion of the vehicle interior).

Although the hinge assemblies 100 and 200 have been described primarily in the context of an automotive application, the exemplary embodiments described herein could be adapted for a variety of other applications involving hinge mechanisms.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the automotive door hinge as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., door component, hinge component, pivot pin, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A vehicle door hinge, comprising:

a door bracket mountable to a vehicle door;

a body bracket mountable to a vehicle body;

a pivot bushing having a cylindrical bearing that is disposed within a pivot axis hole of the body bracket; and a pivot pin that rotatably couples the door bracket and the body bracket together with the pivot pin in single shear, wherein the pivot pin comprises:

a first shoulder disposed within the cylindrical bearing; and a second shoulder extending from the first shoulder, the second shoulder having a knurled cylindrical surface that is disposed within a pivot axis hole of the door bracket.

2. The vehicle door hinge of claim 1, wherein a diameter of the second shoulder is sized differently than a diameter of the first shoulder.

3. The vehicle door hinge of claim 2, wherein the diameter of the second shoulder is smaller than the diameter of the first shoulder.

4. The vehicle door hinge of claim 3, wherein the knurled cylindrical surface of the second shoulder is press fit into the pivot axis hole of the door bracket to rigidly couple the pivot pin and the door bracket together such that the pivot pin rotates with the door bracket upon rotation thereof.

5. The vehicle door hinge of claim 4, wherein the pivot pin further comprises a head that extends from a side of the first shoulder that is opposite the second shoulder, and wherein the head has a diameter that is larger than the diameter of the first shoulder.

6. The vehicle door hinge of claim 5, wherein the pivot pin further comprises a foot that extends from a side of the second shoulder that is opposite the first shoulder, the foot extends beyond an arm of the door bracket having the pivot axis hole disposed therein, and the foot has a diameter that is larger than a diameter of the pivot axis hole of the door bracket to retain the door bracket and the body bracket between the head and the foot of the pivot pin.

7. The vehicle door hinge of claim 1, wherein the pivot bushing has a first flange that extends from a first end of the cylindrical bearing.

8. The vehicle door hinge of claim 7, wherein the pivot bushing has a second flange that extends from a second end of the cylindrical bearing, wherein one of the first and second flanges is disposed between a head of the pivot pin and the body bracket, and the other of the first and second flanges is disposed between the door bracket and the body bracket.

9. The vehicle door hinge of claim 7, wherein the pivot bushing rotates with the door bracket upon rotation thereof relative to the body bracket.

10. The vehicle door hinge of claim 7, wherein the door bracket is rotatable relative to the pivot bushing and the body bracket.

11. A vehicle door hinge, comprising:

a first bracket comprising a base, a single pivot arm extending transversely from the base of the first bracket, and a first pivot axis hole disposed in the single pivot arm of the first bracket;

a second bracket comprising a base, a single pivot arm extending transversely from the base of the second bracket, and a second pivot axis hole disposed in the single pivot arm of the second bracket;

a pivot bushing having a cylindrical bearing that is disposed within the second pivot axis hole; and a pivot pin extending through a bore of the cylindrical bearing, the first pivot axis hole, and the second pivot axis hole to rotatably couple the first and second brackets together with the pivot pin in single shear, wherein the pivot pin comprises a knurled cylindrical surface that has a press fit engagement with the first pivot axis hole to rigidly couple the pivot pin and the first bracket such that the pivot pin rotates with the first bracket upon relative rotation between the first and second brackets.

12. The vehicle door hinge of claim 11, wherein the second bracket is configured to mount to a body component and the first bracket is configured to mount to a door component.

13. The vehicle door hinge of claim 11, wherein the pivot pin comprises a head and a foot on opposite ends of the pivot pin, wherein the head and the foot retain the pivot bushing and the single pivot arms of the first and second brackets therebetween.

14. The vehicle door hinge of claim 13, further comprising a nut coupled to a threaded portion of the foot, wherein the knurled cylindrical surface is located between the threaded portion and the head of the pivot pin.

15. The vehicle door hinge of claim 14, wherein the pivot bushing comprises:

a first flange extending radially outward from a first end of the cylindrical bearing, wherein the first flange is sandwiched between the single pivot arm of the first bracket and the single pivot arm of the second bracket to facilitate rotation therebetween; and a second flange extending radially outward from a second end of the cylindrical bearing, wherein the second flange is sandwiched between the single pivot arm of the second bracket and the head of the pivot pin.

16. A vehicle door hinge comprising:

a first bracket comprising:

a base mountable to one of a vehicle door or a vehicle body;

a single pivot arm extending at a first angle from the base of the first bracket, the single pivot arm of the first bracket having an inner surface that defines a first pivot axis hole;

a second bracket comprising:

a base mountable to the other of the vehicle door or the vehicle body;

a single pivot arm extending at a second angle from the base of the second bracket, the single pivot arm of the second bracket having a second pivot axis hole;

a pivot bushing having a cylindrical bearing disposed within the second pivot axis hole; and a pivot pin comprising:

a first shoulder extending through a bore of the cylindrical bearing so that the cylindrical bearing is provided between the first shoulder and the single pivot arm of the second bracket; and a second shoulder extending from the first shoulder through the first pivot axis hole, the second shoulder having a knurled surface contacting the inner surface of the single pivot arm of the first bracket;

wherein the first bracket is rotatably coupled to the second bracket through the pivot pin, and the pivot pin is in single shear; and wherein the pivot bushing has a first flange that extends from a first end of the cylindrical bearing, and the first flange is located directly between the single pivot arm of the first bracket and the single pivot arm of the second bracket.

17. The vehicle door hinge of claim 16, wherein the pivot bushing has a second flange that extends from a second end of the cylindrical bearing, which is opposite the first end, and wherein second flange is disposed directly between a head of the pivot pin and the single pivot arm of the second bracket.

18. The vehicle door hinge of claim 17, wherein the first shoulder extends from the head, the second shoulder extends from the first shoulder opposite the head, and the first shoulder has a diameter that is larger than a diameter of the second shoulder.

19. The vehicle door hinge of claim 18, wherein the pivot pin further comprises an end extending from the second shoulder opposite the first shoulder, and the end has a diameter that is larger than the diameter of the first shoulder and a diameter of the first pivot axis hole.

* * * * *